(12) United States Patent
Clark

(10) Patent No.: X9745
(45) Date of Patent: Jun. 20, 1836

(54) LEAD, WHITE

(76) Inventor: Edward Clark of Edward Clark

The Schedule referred to in these Letters Patent, and making part of the same, containing a description in the words of the said Edward Clark himself of his improvements in the manufacture of "Metallic salts usually denominated White or Carbonate of Lead, Carbonate of Copper, acetate of Lead, acetate of copper, & the acetate or per acetate of iron," for which Letters Patent were granted, dated the [illegible] day of December 1828 which Letters Patent were cancelled on account of a defective specification & other Letters Patent granted on the 3d day of July 1832, which last Letters Patent are hereby cancelled also on account of a defective Specification —

To all to whom these Presents shall come:

Be it known that I, Edward Clark, of the town of [illegible] State of New York, & a citizen of the United States have discovered & invented a new and useful improvement in the manufacture of the Carbonate of Lead, or White Lead, or if the operator chooses to use & apply the process in the manufacture of the acetate of Lead, the carbonate & acetate of copper and acetate & per acetate of iron — The process will produce all the above results by merely varying the metal required to be acted upon; & by increasing the relative proportions of the acetic acid or vinegar when the manufacture of the acetates are required; & altogether omitting the carbonic acid where the acetate or per acetate of iron is intended to be produced. But the process is principally useful in the manufacture of white Lead, or carbonate of Lead, & to that object & the manufacture of the sugar or acetate of Lead, I shall confine myself in this description — This being an amended specification for a Patent to be issued in lieu of one [illegible] surrendered.

To carry into effect my improvements in the manufacture of White Lead. I construct a cylindrical vessel of plank, ten or twelve feet in height & about the same in diameter. This vessel should be made tight & strong enough to resist some pressure
from within. This is called the corroding chamber or cistern.
It may also be made in the form of a box [illegible] fifteen feet
long, eight or ten feet high & four or eight feet broad, or of any
other convenient shape or size, as the price & quantity of metal
[illegible] intended to be operated upon at a time may require.
The sheets of lead cast in the usual manner & form, are hung
or supported on wooden rods or laths which are supported by [illegible]
secured to the inside of the corroding chamber, & the sheets are
placed as closely as they can conveniently be, & not touch each other.
The sheets of lead may be rolled & placed on shelves perforated
with holes, or upon any kind of [illegible] or [illegible] work or in vessels
containing vinegar, but not in contact with it, or in any other
manner so as to expose their surface to the action of the acid
vapours & other agents brought to act on them.

The agents I use to corrode metallic lead & make the ar-
ticle called carbonate of lead or white lead, are the vapour of
vinegar, carbonic acid gas & oxygen gas, the last of which
is contained in sufficient quantity in the atmospheric air.
& these agents are made much more speedily effective by being
heated & used in greater quantities or proportions than they have
heretofore been applied to the same purpose, in the same space of
time, & by means of all which I produce a [illegible] & useful
result.

To raise the vapour of vinegar so as to fill the corroding
cistern & to envelope the sheets of lead with it in the most effectual
manner is my object; & this I accomplish in various ways, without
being able to give a decided preference to either.

Firstly. I put the vinegar into a copper still, as shewn
at C fig 1. of the annexed drawing: & then by applying heat to
the furnace below, generate the vapour of vinegar, which passes from
the still into the pipe G and thence along with the other agents
thro' the branch pipes. H.H. &c. and [illegible] stop cocks O.O. &c. into the corroding chambers A.A.&c. shewn also in fig. 1. When this method is resorted to, the corroding agents pass from the branch pipes H.H. &c. into the long boxes of three or four inches depth & breadth, which are placed on the sides of the chambers & are perforated in their sides with a number of small holes for the more equal distribution of the corroding agents.

Secondly. The vinegar is put into shallow vats or troughs which also lie on the bottom of the corroding chambers, and thro' which copper or leaden pipes, which communicate with the steam generator, shewn at C. fig. 4. are passed once or more times over the bottom of the troughs according to the quantity of acid vapour required to corrode the metal acted on, in the most efficient manner.

Thirdly. I put vinegar in vessels, & at a short distance above it, I place coils of sheet lead. & filling my corroding chambers with these vessels, introduce the carbonic acid gas & atmospheric air heated to such a temperature as to produce the requisite evaporation of the vinegar — or fourthly. I place a still on the outside of the corroding chamber, which is furnished with a charging, discharging & vapour pipe, each regulated by a stop cock. One of these pipes is for the conveying of water into the boiler, one is for drawing it off, & the other is to conduct the steam from it & communicate the requisite degree of heat to the corroding chamber, for the evaporation of the vinegar. This pipe is conducted thro' a tube or packing box into the corroding chamber. The pan [illegible] which contains the vinegar is supplied or emptied at pleasure, & is there, from a convenient part of the corroding chamber taken out thro' a tube or packing. All the pipes should be furnished with stop cocks to regulate the supplying of whatever may pass thro' them. Sometimes cocks or other contrivances are used to ascertain the depth or quantity of vinegar which the troughs, vats, stills, or chambers may contain. The quantity of carbonic acid gas necessary to be introduced into the corroding chambers is not great. Pure coal is used for heating) the vinegar. I take this gas by means of the induction pipe to the blowing apparatus from the furnace of the boiler or still; & where coal is not used. I take it from a small furnace built for the purpose, in which anthracite coal or wood is burned expressly for the generation of this gas. A view of this pipe is shown at B. fig 1. and a sectional view at D. fig 3. of the Annexed Drawing. The quantity of atmospheric air or oxygen gas which is contained in it, is more considerable than that of the carbonic gas (say in the proportion of two to one) and I obtain this either thro' branch pipes or apertures in the pipe B as shown at F. fig 1. and at E fig 3. or from an aperture at or near the top of the furnace, which I leave for the purpose. The introduction of an excess of the corroding agents, into the corroding chambers is of no material consequence, because they pass off thro' the branch pipes shown at K.K. in the pipe L and thence into the other chambers successively until they are nearly or quite expended.

Connected with the requisite supply of oxygen gas or air containing oxygen gas & carbonic acid gas into the corroding chambers is a gas blowing apparatus, which receives the gases above named in the manner before described & forces them into the corroding chambers. Since therefore both the carbonic acid gas & the vapour of vinegar must be generated without the corroding chambers. For the purpose of introducing these gases into the corroding chambers I have made use of the common Blacksmith's Bellows & by dividing the blast so that one portion of the atmosphere air was made to pass thro' a tight furnace containing ignited coal & thus furnish the carbonic acid gas, while the other supplied the requisite quantity of oxygen gas. I have also used the water bellows which is constructed by placing one inverted vessel into another vessel containing water & furnished with induction & eduction valves and pipes, which were made to force the requisite supply of the above mentioned gases into the chambers by giving to the inverted vessels a [illegible] but continually [illegible] up & down motion and at side hand [illegible] bellows [illegible] for the same purpose.

Descriptions of both of these [illegible] bellows will be found in Nott's works treating on Hydraulics (but I now use a cast iron double acting bellows [illegible] minute [illegible] making [illegible] strokes in a minute forces in a sufficient quantity of the gases to act upon about fifty or sixty tons of lead [illegible] at the same time.

In fig 1 the gases & vapour of vinegar are represented as being forced in a mixed or combined state into the gas distributing box of the corroding chamber. This box is shown at fig 7

Fig 2 represents a series of cisterns to which the gases are introduced thro' the gas distributing boxes by themselves while the heat imparted thro' the medium of steam using the pipes E.E. & branch pipes F.F. to & thro' the troughs containing vinegar which are on the floor of the corroding cisterns, affords the requisite quantity of acid vapour & degree of temperature.

The vinegar bath or trough with its steam pipes & stop cocks are shown at A.B. D.D. fig 2. It should be remarked that in proportion to the increase of temperature will the process of corrosion to a certain extent be expedited — however the temperature should range somewhere between 100° & 200° of Fahrenheit & the operator should regulate it by the moist or dry appearance of the lead acted on in the chambers. The heat should be lessened & the gases increased when the lead is too moist & vice versa when the lead is too dry. Ordinarily, the gases when combined with the vapour of vinegar will impart the requisite degree of heat but when introduced by themselves.

I pass them thro' an apartment which [illegible] heated, such as that represented at K.K. fig 6. which is heated by the smoke pipe III. passing from the furnace to thro' it to the chimney— In making the acetate or sugar of lead &c the acetate of copper, it is only necessary when the lead & copper become corroded, to shut off the gases [illegible] the acid vapour until the carbonates which have been previously formed are converted into acetates & then evaporating the liquor which remains in the corroding chamber.

In making the per acetate or acetate of iron the vapour of vinegar and atmospheric air only are admitted & the quantity of the latter must be particularly regarded, or the oxide of iron held in solution by the acid will be precipitated. When formed this material should should it be put into close casks, & so kept till required for use.

The carbonate of copper is made in precisely the same way as the carbonate of lead, but its conversion from the metallic state being much more slow & difficult than that of lead: it is found expedient to conduct this process by applying the nearly exhausted residue of the lead corroding chambers to it.

Where the corroding agents are too abundantly supplied, I place a box resembling that of the gas distributor [illegible] at B. fig 7. but containing about half the number of holes in the inside and upper part of the corroding chambers & connect it by the branch pipe K to the pipe x fig. 1. which leads to & discharges itself into one or more chambers in succession which are supplied with sheet lead or copper, with a view of saving the residue of the corroding agents should any have escaped the first application. The blowing cylinder is made similar to the cylinder of a steam engine with the valves much enlarged & it may be put into operation by water, steam, or animal power.

My improvement consists in applying the combined means before described & all other substantially the same which may be arranged for forcing oxygen gas & carbonic acid gas, either pure or in a state of combination with other substances into chambers or cisterns heated or not heated which have previously been furnished with castings
or sheets of lead or copper according to the metal designed
to be acted on. I therefore claim as my invention the plan
of forcing atmospheric air into close, tight, & strong
corroding chambers in connexion with carbonic acid gas
& the vapour of vinegar & increasing their action by artific-
ial heat, pressure & motion, by which the corroding agents
are kept into close contact with the sheets of lead or copper,
and are made to act more vigorously than in any other
way heretofore known & practised — also in combination
with each other, & with the above described corroding cham-
bers, vats, troughs, boxes, boilers, & apparatus for conducting &
forcing the agents for corroding the lead or copper, into the
corroding chambers in the manner above described or in
any other manner substantially the same. The accom-
panying Drawing will further illustrate my specification.

Witnesses
Geo A. Bicknell Jun
Geo. Curtis.

Edward [illegible]

2566 [illegible]

Description of the annexed Drawings — fig 1. represents
a series of corroding cisterns with a blowing apparatus, for
supplying them with atmospheric air, carbonic acid gas,
& the vapour of vinegar. A A &c represents the corroding
cisterns or chambers. B the blowing cylinder or apparatus
C the still or copper boiler containing vinegar. D the furnace
for heating the vinegar & also for supplying carbonic acid gas
to the induction pipe for supplying the blowing apparatus with
carbonic acid gas from the furnace. E an aperture to admit
a supply of atmospheric air into the blowing cylinder thro'
the pipe F. G the eduction pipe for conveying the carbonic
acid gas, the atmospheric air, & the vapour of vinegar into the corroding cisterns or chambers. H. H. &c the lateral branch
pipes for supplying the distributing boxes seen at B. B. fig
II, with the corroding materials from the main pipe G.
I I &c the stop cocks to regulate the admission or exclusion
of the corroding materials at the pleasure of the attendant.
K. K. &c the eduction branch pipes, with their cocks. L the
main eduction pipe.
Fig II, represents an interior view of the corroding cis-
terns or chambers, partially supplied with their castings of
metallic lead, disposed for corrosion in various ways A. A.
represents two chambers laid open B. B. the boxes perfora-
ted with small holes for distributing the corroding mate-
rials in the chambers C. D. & E. sheets of lead suspended or
coiled as exposed for corrosion.
Fig III represents a sectional view of the blowing appa-
ratus, furnace &c [illegible], as shown entire in fig I.
Fig IV. representing a series of corroding cisterns with
the gas distributing apparatus as described in Fig I. with
an additional apparatus for heating the gases (also for
generating hot [illegible] steam within the chambers. A A &c
A [illegible] of the chambers or corroding cisterns. B the blowing
cylinder. C the steam boiler. D the furnace. E. E. E. main
steam pipe. F F &c branch steam pipes leading from E.
through the troughs G, in the chambers. G. G. &c the ends of
the troughs as shown projecting from the corroding cisterns
in A Fig VII for receiving the vinegar which is to be heated
by the steam pipes F thro' the apertures there shown at G.
H. H &c the pipes for conveying the gases thro' the heat-
ed chambers of the furnace as shown at [illegible] fig VIII from
the blowing cylinder, thro' the branch pipes I. &c to the corro-
ding chambers. I I &c the lateral branches of the main
gas pipe for conveying the gas to the distributing boxes as
seen at B. B. fig I. & furnished with stop cocks the same as thrown in the steam pipes. [illegible] the smoke pipe. Fig V.
Two of the chambers open to view. A.A. the two chambers or
Corroding cisterns B.B. troughs for containing vinegar C.C. boxes
for distributing the gases. D.D. &c rods or laths for supporting
sheets of lead E.E. &c sheets of lead suspended over the [illegible]

Fig. VI. A vertical section of one of the chambers with its
door removed. A.A. &c the rods or laths for supporting the
sheets of lead. B the trough for containing the vinegar C the gas
distributing box Fig. VII. A ground plan of one of the cisterns with
its trough, box & pipes. A is the trough for containing vinegar.
B. the steam pipe running thro' the vinegar trough A, C the
pipe for conveying off the waste steam or condensed vapour
D.D. stop cocks for regulating the supply of the corroding
material. E. the gas distributing box F the branch of the main
pipe connected with the distributing box.

Fig. VIII. A sectional view of the blowing cylinder, & chamber, for heating the gases. A represents the piston head
& rod of the cylinder. B.B. the induction valves. C.C. the
eduction valves. D the induction pipe for supplying carbonic acid gas from the furnace & air from the aperture shown
at F. F the aperture for admitting atmospheric air. G the
eduction pipe which conveys the gas from the blowing
cylinder to the heated chamber. H.H. a boiler for converting
water into steam & heating the vinegar in the trough. I.I
the furnace. [illegible] the smoke pipe. K.K. the chamber for
heating the gases on their passage thro' the pipe L to be distributed thro' the cisterns. L pipe leading from the heated &c. H.
chamber for the conveyance of the heated gases as above [illegible]
described.

3208 [illegible]

United States Patent
Patent No.: X9745
Sheet 1. 2 Sheets
E. Clark,
Manufacture of White Lead.
Reissued June 20, 1836.
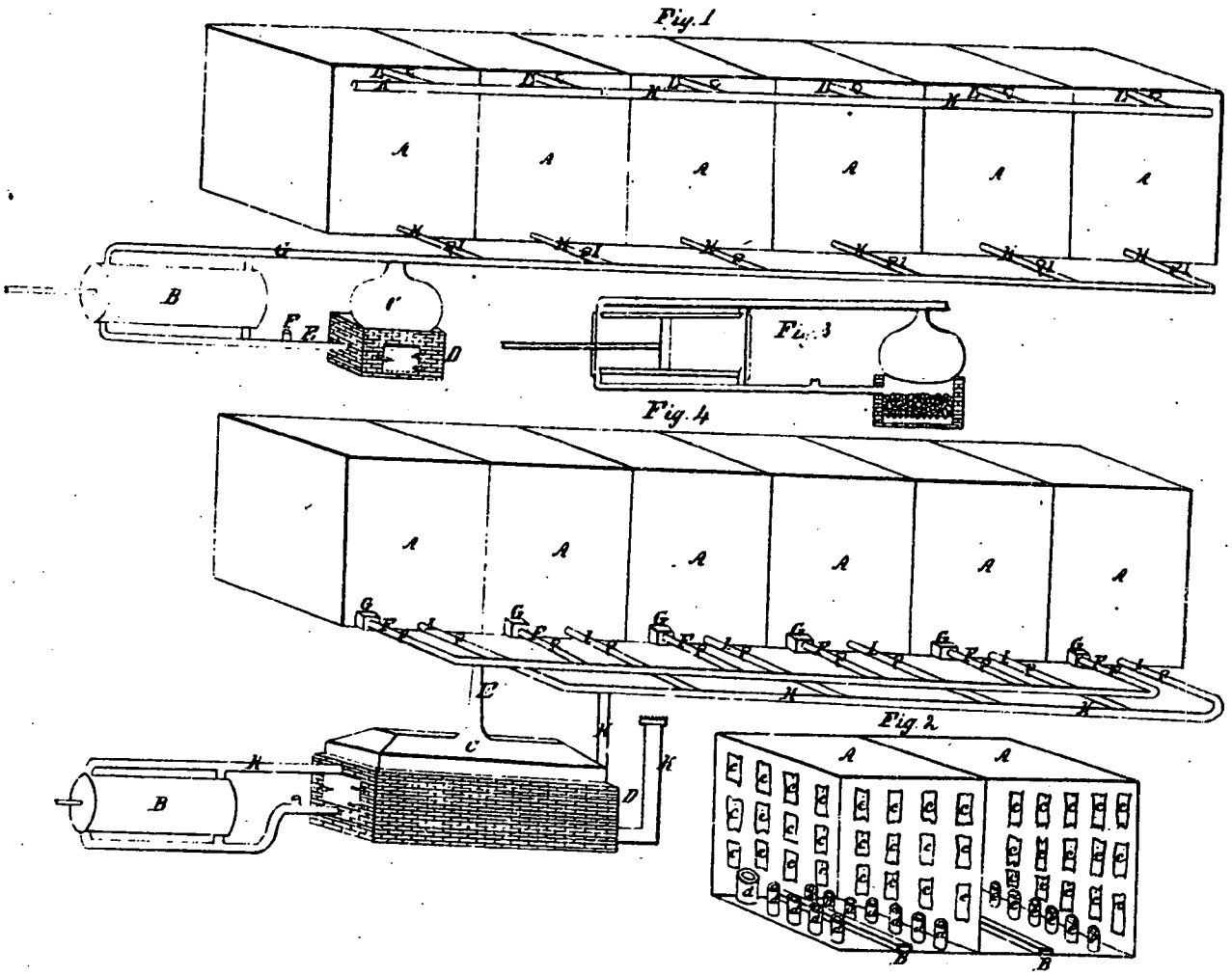

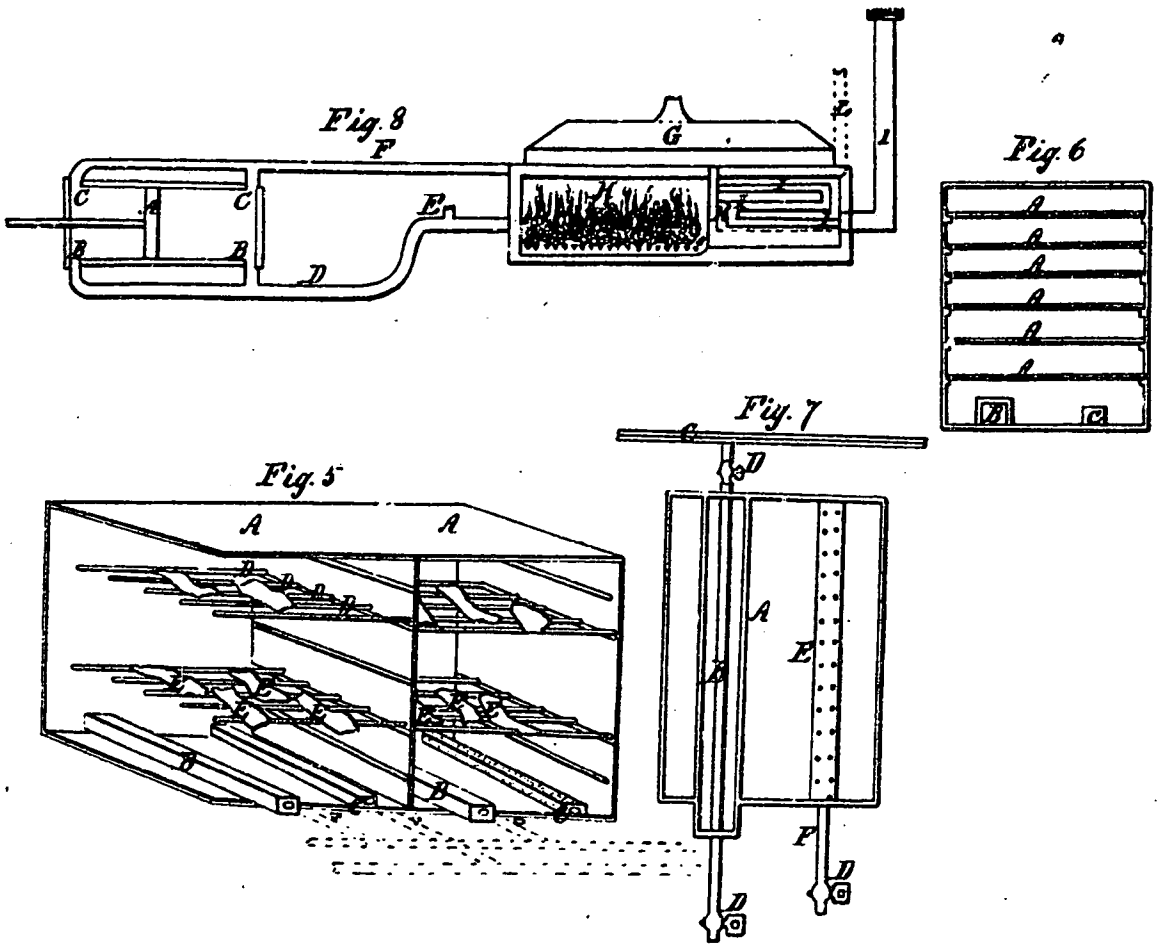

Sheet 2. 2 Sheets
E. Clark,
Manufacture of White Lead,
Reissued June 20, 1836.